United States Patent
Hojin et al.

(10) Patent No.: US 11,697,413 B2
(45) Date of Patent: Jul. 11, 2023

(54) VEHICLE CONTROL DEVICE

(71) Applicants: Mazda Motor Corporation, Hiroshima (JP); NXP B.V., AG Eindhoven (NL)

(72) Inventors: Eiichi Hojin, Hiroshima (JP); Kiyoyuki Tsuchiyama, Hiroshima (JP); Masato Ishibashi, Hiroshima (JP); Daisuke Hamano, Hiroshima (JP); Tomotsugu Futa, Hiroshima (JP); Daisuke Horigome, Hiroshima (JP); Atsushi Tasaki, Hiroshima (JP); Yosuke Hashimoto, Hiroshima (JP); Yusuke Kihara, Hiroshima (JP); Arnaud Van Den Bossche, Munich (DE); Ray Marshal, Glasgow (GB); Leonardo Surico, Munich (DE)

(73) Assignees: MAZDA MOTOR CORPORATION, Hiroshima (JP); NXP B.V., AG Eindhoven (NL)

( * ) Notice: Subject to any disclaimer, the term of this patent is extended or adjusted under 35 U.S.C. 154(b) by 150 days.

(21) Appl. No.: 17/159,175

(22) Filed: Jan. 27, 2021

(65) Prior Publication Data
US 2021/0241028 A1    Aug. 5, 2021

(30) Foreign Application Priority Data
Feb. 5, 2020  (JP) .................. 2020-017988

(51) Int. Cl.
*B60W 30/14* (2006.01)
*B60W 40/08* (2012.01)
(Continued)

(52) U.S. Cl.
CPC .......... *B60W 30/14* (2013.01); *B60W 30/143* (2013.01); *B60W 40/08* (2013.01);
(Continued)

(58) Field of Classification Search
CPC ................................ B60W 50/0205
See application file for complete search history.

(56) References Cited

U.S. PATENT DOCUMENTS 8,095,816 B1 *  1/2012  Chan ...................... G06F 1/3287
                                                710/56
10,318,822 B2   6/2019  Gao et al.
(Continued)

FOREIGN PATENT DOCUMENTS

JP        2018-181475 A     11/2018

*Primary Examiner* — Imran K Mustafa
(74) *Attorney, Agent, or Firm* — Xsensus LLP

(57) ABSTRACT

A vehicle control device includes: a signal processing IC unit that outputs image processing data; a recognition processing IC unit that performs recognition processing of the external environment of a vehicle to output external environment data obtained through the recognition processing; a judgment processing IC unit that performs judgment processing for cruise control of the vehicle; a power management unit capable of controlling an on or off state of a recognition function of the external environment of the vehicle in the recognition processing IC unit according to the conditions of the vehicle; and a bypass path for enabling data communications from the signal processing IC unit to the judgment processing IC unit without performing the recognition processing of the external environment of the vehicle by the recognition processing IC unit.

17 Claims, 7 Drawing Sheets

(51) Int. Cl.
 *B60W 50/02* (2012.01)
 *G06V 10/94* (2022.01)
 *G06V 20/56* (2022.01)
 *G06F 18/21* (2023.01)
 *G06V 10/764* (2022.01)

(52) U.S. Cl.
 CPC ......... *B60W 50/0205* (2013.01); *G06F 18/21* (2023.01); *G06V 10/764* (2022.01); *G06V 10/955* (2022.01); *G06V 20/56* (2022.01); *B60W 2420/42* (2013.01); *B60W 2420/52* (2013.01); *B60W 2555/00* (2020.02)

(56) References Cited

U.S. PATENT DOCUMENTS

2013/0182111 A1* 7/2013 Ogasawara ............... B60Q 1/00
 348/148
2020/0210726 A1* 7/2020 Yang .................... G06V 10/454

* cited by examiner

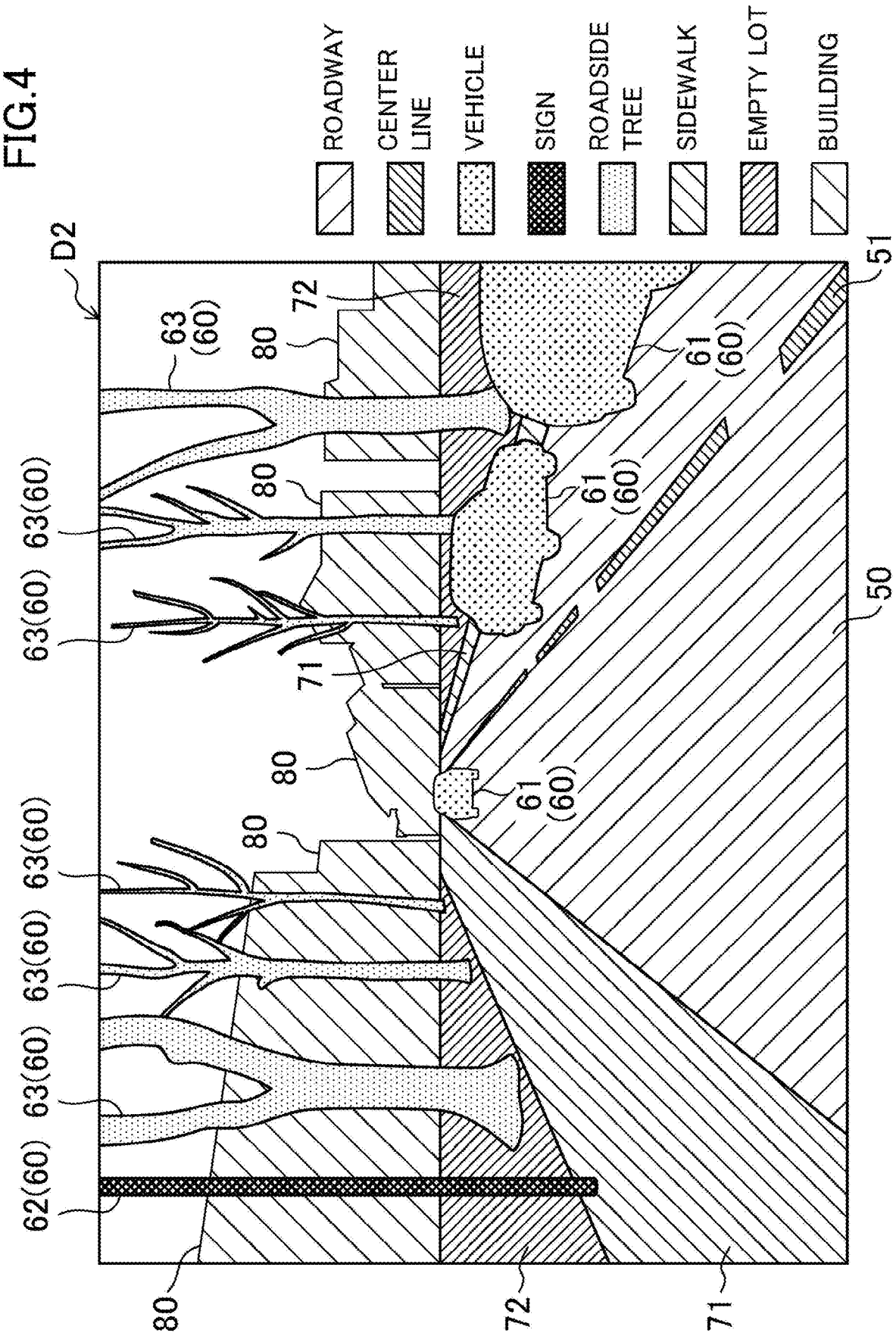

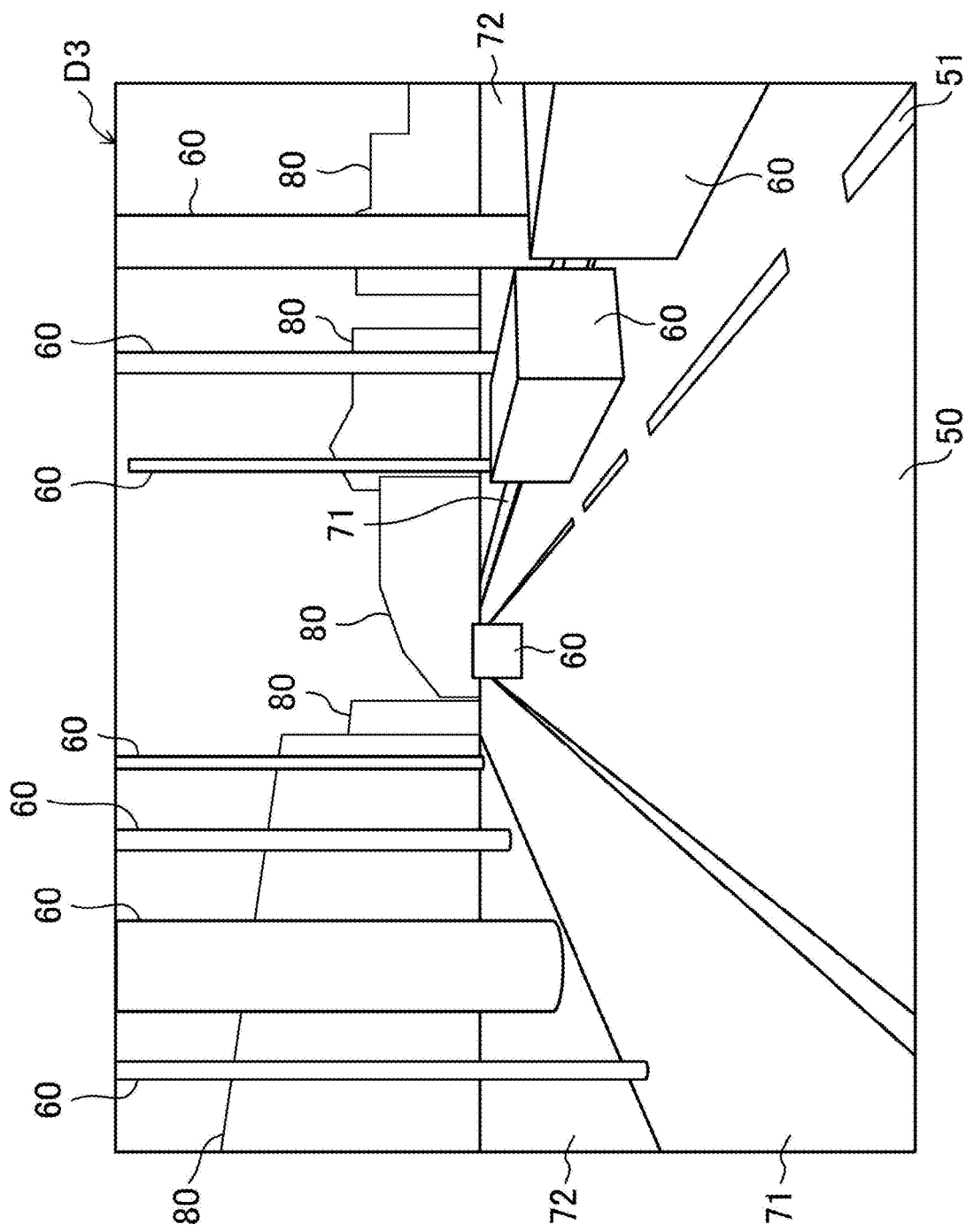

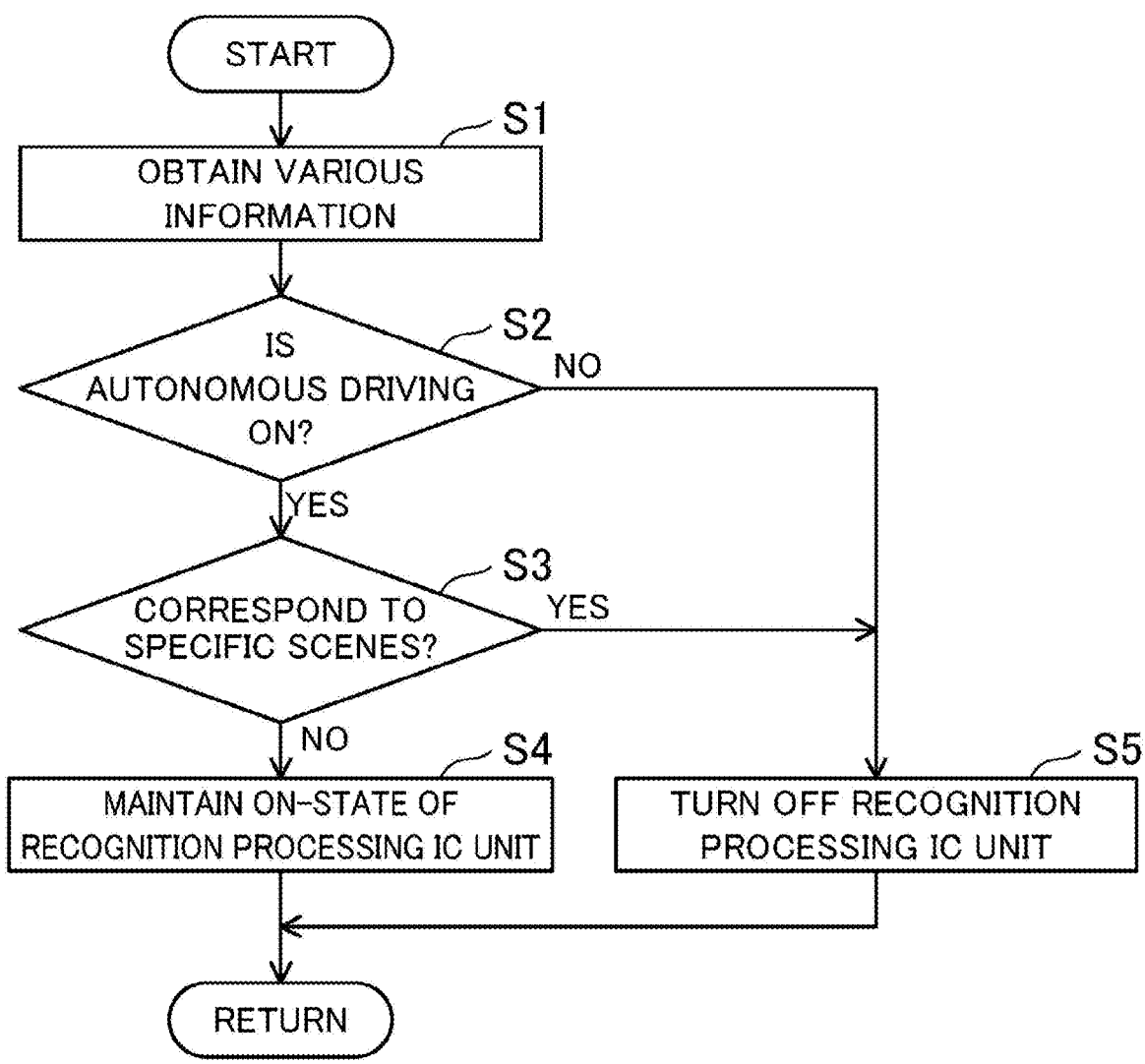

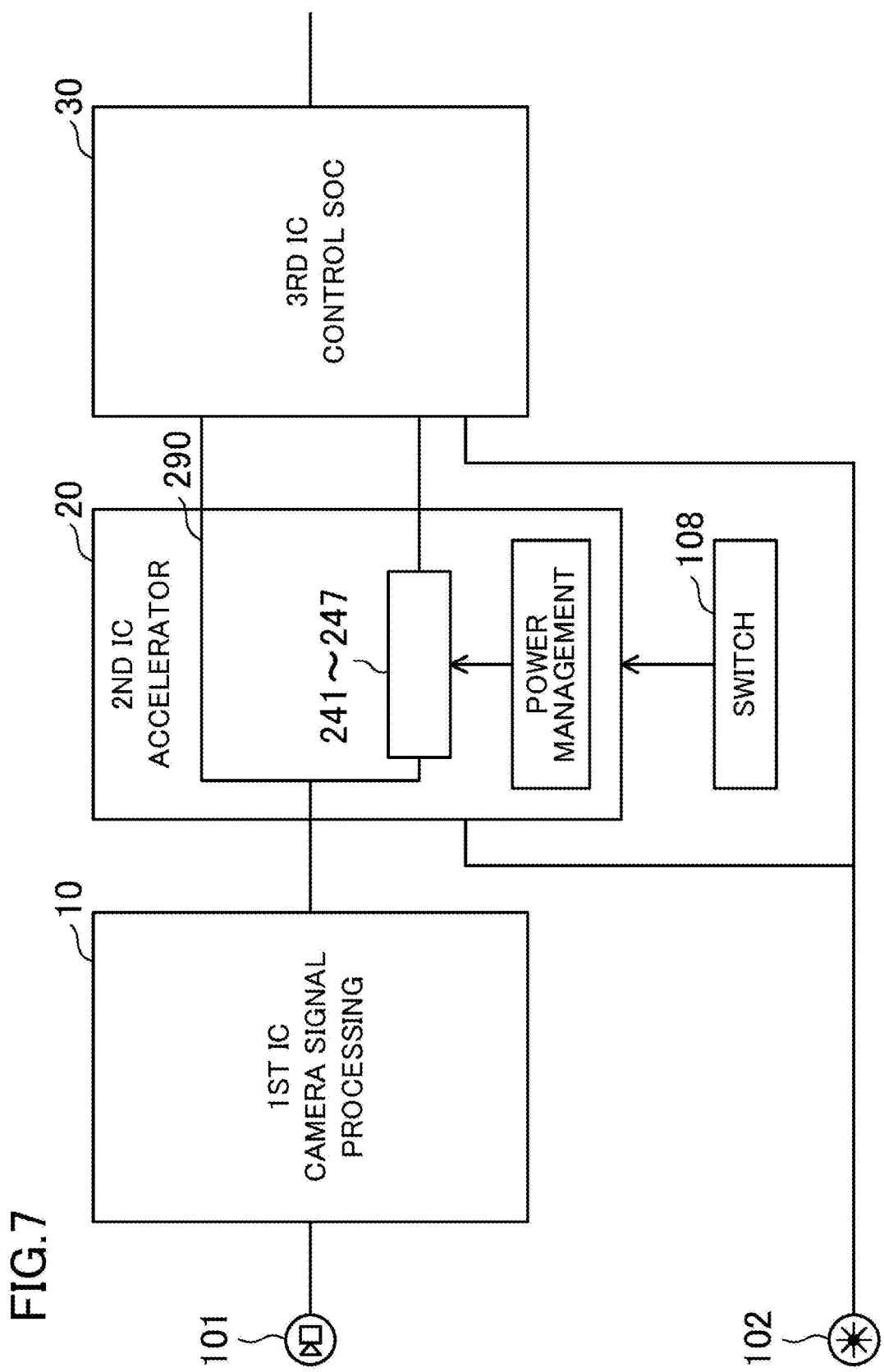

VEHICLE CONTROL DEVICE

CROSS-REFERENCE TO RELATED APPLICATION

This application claims priority to Japanese Patent Application No. 2020-017988 filed on Feb. 5, 2020, the entire disclosure of which is incorporated by reference herein.

BACKGROUND

The present disclosure belongs to a technical field related to a vehicle control device. Control devices are typically known which perform cruise control of vehicles. For example, Japanese Unexamined Patent Publication No. 2018-181475 describes an autonomous driving control device as a device for controlling a vehicle for autonomous driving.

The autonomous driving control device disclosed in Japanese Unexamined Patent Publication No. 2018-181475 includes a controller that executes autonomous driving control of a vehicle, a battery temperature detector that detects the temperature of a battery for supplying the electric power to be used for driving the vehicle. While the battery temperature detector operates normally and the battery temperature is out of an appropriate range, the controller executes one or both of first restriction control and second restriction control. The first restriction control is for restricting at least a part of the functions of the autonomous driving control. The second restriction control is for restricting at least a part of non-autonomous driving functions of vehicle functions, which are not required for the autonomous driving control, to increase the electric power supplied from the battery for the autonomous driving control.

SUMMARY

When a vehicle cruise is controlled in accordance with the external environment of the vehicle, first, the external environment is generally recognized based on image data obtained by cameras, for example. This recognition of the external environment requires processing on a huge amount of image data. Accordingly, a large computational load is applied to the part of the control device that executes the recognition processing of the external environment. With a large computational load applied to the control device, the power consumption and temperature of the control device tend to increase.

If a vehicle cruise is controlled in accordance with the external environment of the vehicle, a malfunction of the part executing the recognition processing of the external environment hinders proper vehicle cruise control.

It is an objective of the present disclosure to provide a vehicle control device that performs cruise control of a vehicle with a lower power consumption and executes proper cruise control even at a time of wrong recognition function of the external environment.

The present disclosure is directed to a vehicle control device mounted in a vehicle and capable of performing cruise control of the vehicle according to an external environment of the vehicle.

This vehicle control device includes: a first integrated circuit (IC) unit mounted in the vehicle, and for performing image processing on an output from a camera for capturing an external environment of the vehicle to output image data obtained through the image processing; a second IC unit different from the first IC unit, and for performing recognition processing of the external environment of the vehicle based on the image data to output external environment data obtained through the recognition processing; a third IC unit different from the first and second IC units, and for performing judgment processing for the cruise control of the vehicle based on the image data or the external environment data; a power management unit capable of controlling an on or off state of a recognition function of the external environment of the vehicle in the second IC unit according to a condition of the vehicle; and a bypass path for enabling data communication from the first IC unit to the third IC unit without performing the recognition processing of the external environment of the vehicle by the second IC unit.

Specifically, when a vehicle travels in a city, there are a lot of objects around the vehicle. Detailed external environment data may thus be calculated which has been subjected to the recognition processing by the second IC unit. On the other hand, when a vehicle travels on a highway or parks in a parking lot, no detailed external environment data is required. Under the circumstances of the vehicle, the following degree of control does not largely influence the vehicle cruise. The parameters related to the vehicle cruise are calculated from the external environment data (e.g., the data on the images of the external environment) that has not subjected to the recognition processing. With the configuration described above, the third IC unit obtains the image processing data from the first IC unit via the bypass path, and calculates the parameters related to the vehicle cruise based on the image processing data. Accordingly, the turning off of the recognition function of the second IC unit as appropriate in accordance with the vehicle conditions does not largely influence the vehicle cruise. Thus, the recognition function of the second IC unit is turned off as appropriate to reduce a huge amount of the arithmetic processing by the second IC unit, which reduces the power consumption of the vehicle control device. This configuration also reduces the heat generated in the second IC unit and the power consumption increased by the heat generation.

The third IC unit calculates the parameters related to the vehicle cruise based on the image processing data. Accordingly, the third IC unit executes proper cruise control using the image processing data obtained via the bypass path, even if there is a wrong recognition function of the external environment caused by a failure of the second IC unit or any other factor.

In the vehicle control device, the second IC unit may be configured to perform the recognition processing of the external environment using deep learning techniques based on the image processing data.

With this configuration, the second IC unit uses the deep learning techniques. Thus, the recognition processing of the external environment by the second IC unit requires a large computational load. Thus, the recognition function of the external environment of the second IC unit is turned off as appropriate to effectively reduce the power consumption.

In the vehicle control device, the bypass path may be configured as a communication line bypassing the second IC unit to connect the first IC unit to the third IC unit.

According to this configuration, even if all the functions of the second IC unit are turned off, the third IC unit obtains the image processing data from the first IC unit. Accordingly, the power consumption decreases more effectively.

The vehicle control device may further include a switch capable of selecting an on or off state of the recognition function of the second IC unit according to an intention of an occupant of the vehicle. If the switch selects turning off the recognition function of the second IC unit, the power management unit turns off the recognition function of the second IC unit.

According to this configuration, the recognition function of the second IC unit can be turned off in accordance with the intention of the occupant of the vehicle. Thus, for example, even when the vehicle travels in a city, the recognition function of the second IC unit can be turned off as appropriate. As a result, the power consumption decreases more effectively.

The vehicle control device may further include an abnormality determiner for determining presence or absence of an abnormality in the second IC unit. If the abnormality determiner determines that the abnormality is detected in the second IC unit, the power management unit turns off the recognition function of the second IC unit regardless of a condition of the vehicle.

That is, if there is an abnormality in the second IC unit, it is highly likely that the external environment data output from the second IC unit includes an error. For this reason, if the parameters related to the vehicle cruise are calculated based on the external environment data output from the second IC unit which has an abnormality, the vehicle cruise control cannot be performed properly. In the configuration described above, upon determination that there is an abnormality in the second IC unit, the recognition function of the second IC unit is turned off regardless of the vehicle conditions. Accordingly, the third IC unit calculates less or no parameters related to the vehicle cruise based on the erroneous external environment data. As a result, even if there is a wrong recognition function of the external environment, proper cruise control can be executed more effectively.

BRIEF DESCRIPTION OF THE DRAWINGS

FIG. 4 shows an example segmentation image generated through recognition processing by a recognition processing IC unit.

FIG. 5 shows example integrated data obtained through estimation of the external environment by a judgment processing IC unit.

FIG. 6 is a flowchart showing the on/off control of the recognition processing IC unit by a second power management unit.

FIG. 7 is a block diagram showing a vehicle cruise control device according to a variation.

DETAILED DESCRIPTION

An exemplary embodiment will now be described in detail with reference to the drawings.

Figure 1:
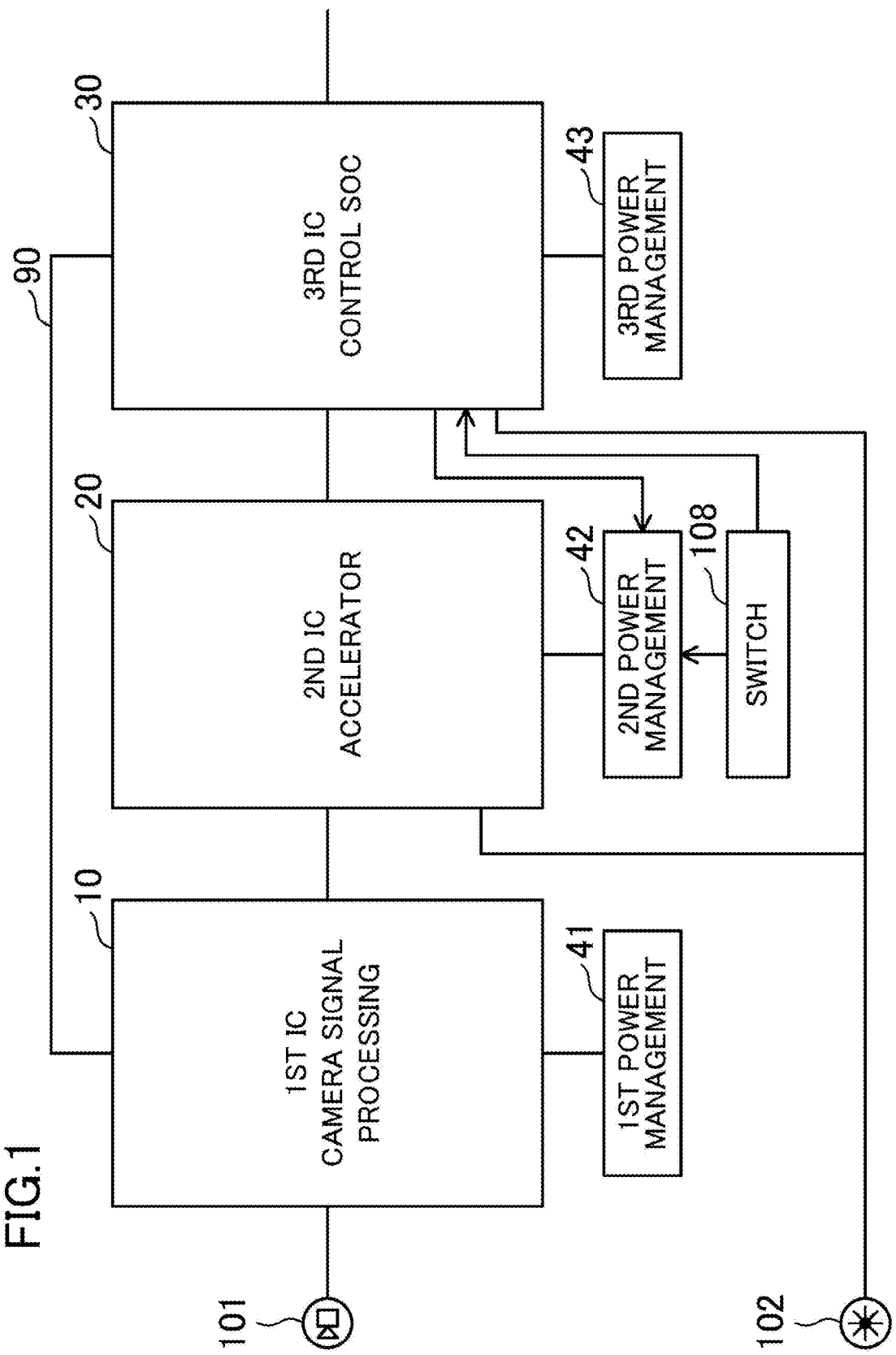
FIG. 1 is a block diagram showing a functional configuration of a vehicle cruise control device according to an exemplary embodiment.

FIG. 1 schematically shows a functional configuration of a vehicle cruise control device (hereinafter simply referred to as a "cruise control device") 1 according to this embodiment. The cruise control device 1 is mounted in a vehicle such as a four-wheeled vehicle. This vehicle is switchable between manual driving and autonomous driving. In the manual driving, the vehicle travels in accordance with the operations by the driver (e.g., the operations of an accelerator or other elements). In assisted driving, the vehicle travels in accordance with the assisted operations of the driver. The autonomous driving includes fully autonomous driving in which the vehicle travels without any operation by the driver, and the assisted driving that assists the driving by the driver. In the autonomous driving, the cruise control device 1 controls actuators mounted in the vehicle to control the operation of the vehicle. The actuators include the engine, the transmission, the brake, and the steering, for example.

The device includes three chips of a signal processing integrated circuit (IC) unit 10, a recognition processing IC unit 20, and a judgment processing IC unit 30. Although not shown in detail, the signal processing IC unit 10, the recognition processing IC unit 20, and the judgment processing IC unit 30 are stored in a single housing placed in a specific location inside a vehicle such as under a seat or in a trunk. Each of the signal processing IC unit 10, the recognition processing IC unit 20, and the judgment processing IC unit 30 may be a single IC chip or may include a plurality of IC chips. In addition, each IC chip may include a single core or die, or a plurality of cores or dies in cooperation with each other.

Figure 2:
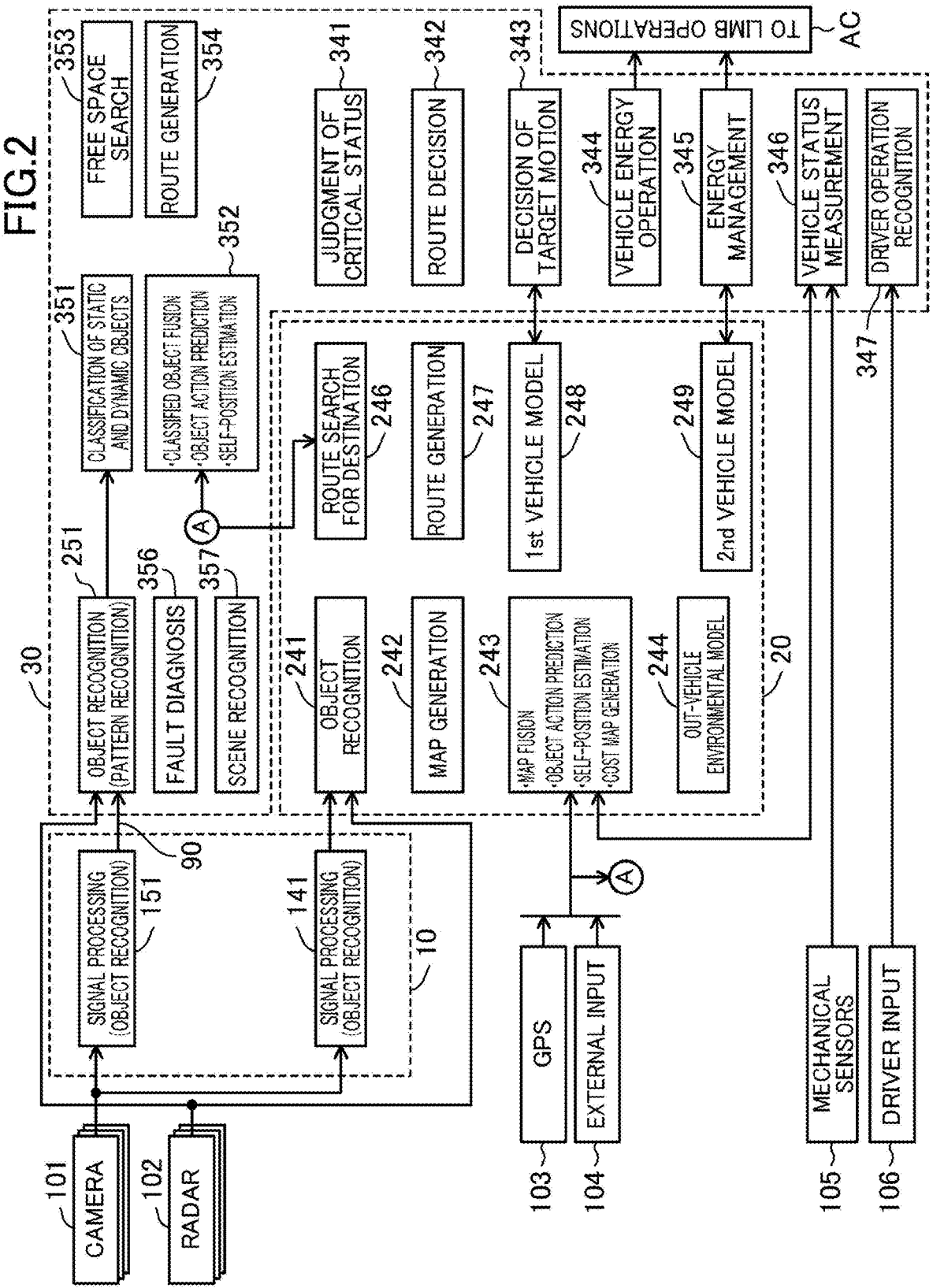
FIG. 2 is a block diagram showing specific configurations of IC units.

The signal processing IC unit 10 performs image processing on imaging signals received from cameras 101, which image the external environment, to output the processed signals as image processing data. The cameras 101 are arranged, for example, to image the surroundings of the motor vehicle at 360° in the horizontal direction. The imaging data of the cameras 101 is aggregated in the signal processing IC unit 10. The signal processing IC unit 10 performs the image processing on the aggregated imaging data, and outputs, as image processing data D1, the processed data to the recognition processing IC unit 20. The signal processing IC unit 10 is controlled to be turned on/off by a first power management unit 41. The signal processing IC unit 10 corresponds to the "first IC unit". FIG. 2 shows a specific example block configuration of the signal processing IC unit 10. FIG. 2 will be described later.

The recognition processing IC unit 20 receives the image processing data output from the signal processing IC unit 10, and receives results of detection by radars 102. The recognition processing IC unit 20 estimates the external environment including roads and obstacles based on the image processing data and the obtained data utilizing deep learning. In the deep learning, a multi-layer neural network (e.g., a deep neural network (DNN) is used, for example. The multi-layer neural network may be a convolutional neural network (CNN), for example. The radars 102 are arranged in the body of the own vehicle to detect the external environment over 360° around the own vehicle. The radars 102 are, for example, millimeter wave radars that transmit millimeter waves (as example detection waves). The radars may be light detection and ranging (Lidar) systems that transmit laser beams (as example detection waves), infrared radars that transmit infrared light (as example detection waves), or ultrasonic sensors that transmit ultrasonic waves (as example detection waves). The recognition processing IC unit 20 corresponds to the "second IC unit".

The recognition processing IC unit 20 generates at least one route candidate avoiding the obstacles on the road based on the estimated external environment, and outputs the generated route candidate as route candidate data. The plurality of radars 102 have the same configuration. FIG. 2 shows a specific example block configuration of the recognition processing IC unit 20. FIG. 2 will be described later.

The recognition processing IC unit 20 is controlled to be turned on/off by a second power management unit 42. In this embodiment, the recognition processing IC unit 20 is controlled to be turned on/off by the second power management unit 42, whereby the recognition function of the external environment of the vehicle by the recognition processing IC unit 20 is controlled to be turned on/off.

The judgment processing IC unit 30 receives the route candidate data output from the recognition processing IC unit 20, and determines a cruise route of the motor vehicle based on the route candidate data. In addition, the judgment processing IC unit 30 determines the target motion of the motor vehicle when traveling along the determined cruise route. After that, the judgment processing IC unit 30 calculates the driving force, the braking force, and the steering angle for achieving the determined target motion. The judgment processing IC unit 30 is controlled to be turned on/off by a third power management unit 43. The judgment processing IC unit 30 corresponds to the "third IC unit". FIG. 2 shows a specific example block configuration of the judgment processing IC unit 30. FIG. 2 will be described later.

<Signal Processing IC Unit>

As shown in FIG. 2, the signal processing IC unit 10 includes two image processors 141 and 151. The image processors 141 and 151 perform distortion correction processing or white balance adjustment processing, for example, of the images captured by the cameras 101. The distortion correction processing is for correcting distortions (distortions due to the wider angles of view of the cameras 101 in this example) of the images. The white balance adjustment processing is for adjusting the white balance of the images. In addition, the image processors 141 and 151 delete pixels unnecessary for the processing (e.g., object recognition) by the recognition processing IC unit 20, among the elements included in the image and thins out the data related to the color (e.g., all of the vehicles are represented by the same color) to generate the image processing data D1. The image processing data D1 created by the image processor 141 is input to the object recognizer 241 of the recognition processing IC unit 20. The image processing data D1 created by the image processor 151 is input to the object recognizer 251 of the judgment processing IC unit 30. As will be described later in detail, the cruise control device 1 includes a bypass path 90 for enabling data communications from the signal processing IC unit 10 to the judgment processing IC unit 30 without performing the recognition processing of the external environment of the own vehicle by the recognition processing IC unit 20.

Figure 3:
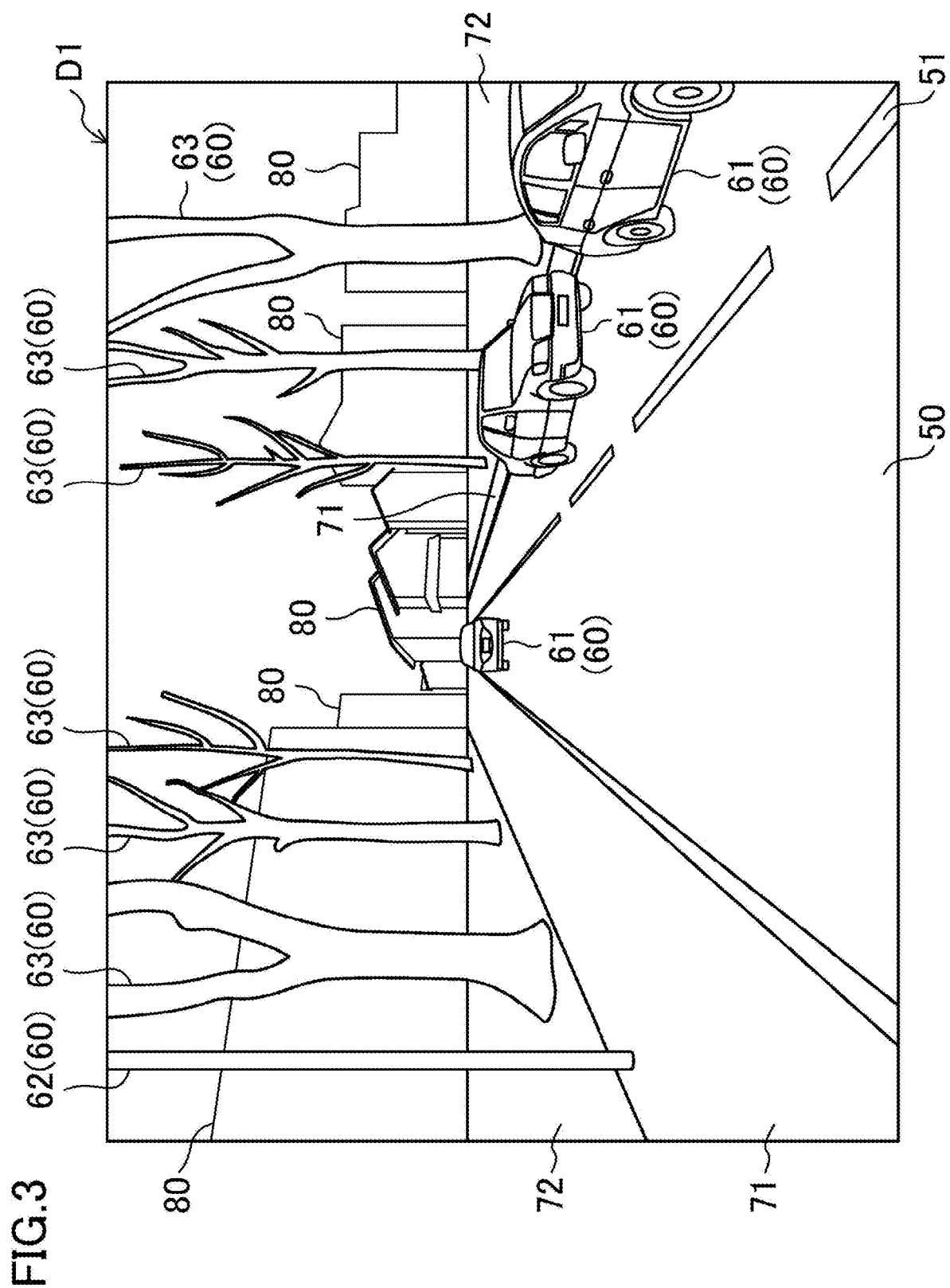
FIG. 3 shows example image processing data obtained through image processing by a signal processing IC unit.

FIG. 3 shows an example of the image processing data D1. The external environment of the own vehicle shown in the image processing data D1 includes a roadway 50, sidewalks 71, and empty lots 72. The roadway 50 is an area movable by the own vehicle. The roadway 50 includes a center line 51. The external environment of the own vehicle shown in this map also includes other vehicles 61, a sign 62, roadside trees 63, and buildings 80. The other vehicles (e.g., four-wheeled vehicles) 61 are example of the "moving object" displaced over time. Other examples of the "moving object" include a motorcycle, a bicycle, and a pedestrian. The sign 62 and the roadside trees 63 are examples of the "stationary object" not displaced over time. Other examples of the "stationary object" include a median strip, a center pole, and a building. The moving and stationary objects are examples of the "objects 60".

In the example shown in FIG. 3, the sidewalks 71 are located outside the roadway 50, and the empty lots 72 are located outside the sidewalks 71 (at far ends from the roadway 50). In the example shown in FIG. 3, the roadway 50 is divided by the center line 51 into two lanes. One of the lanes is traveled by the own vehicle and another vehicle 61. The opposite lane is traveled by two other vehicles 61. Then, the sign 62 and the roadside trees 63 are arranged along the outside of the sidewalks 71. The buildings 80 are located in positions far ahead of the own vehicle.

<Recognition Processing IC Unit>

As shown in FIG. 2, the recognition processing IC unit 20 includes an object recognizer 241, a map generator 242, an external environment estimator 243, an external environment model 244, a route searcher 246, and a route generator 247.

The object recognizer 241 receives the image processing data D1 (including the video data) output from the signal processing IC unit 10, and receives a peak list of reflected waves detected by the radars 102. The object recognizer 241 recognizes the objects outside the vehicle based on the received image processing data D1 and the received peak list. The object recognizer may employ typically known object recognition techniques based on images or radio waves. The results of the recognition processing by the object recognizer 241 are transmitted to the map generator 242.

The map generator 242 performs the processing for dividing the surroundings of the own vehicle into a plurality of areas (e.g., front, right, left, and rear areas) and creating respective maps of the areas. Specifically, the map generator 242 integrates, for each area, the object information recognized by the cameras 101 and the object information recognized by the radars 102, and reflects the integrated information to the map.

The map generated by the map generator 242 is used to estimate the external environment by the external environment estimator 243 in the image recognition processing using the deep learning. Specifically, the external environment estimator 243 creates a three-dimensional (3D) map representing the external environment through the image recognition processing based on the external environment model 244 constructed utilizing the deep learning. In deep learning, a multi-layer neural network is used. The multi-layer neural network may be CNN, for example.

More specifically, the external environment estimator 243 (1) combines the maps for the areas, and generates the integrated map representing the surroundings of the own vehicle, (2) estimates the types and the displacements of the distances, directions, and relative speeds of moving objects and stationary objects within the integrated map with respect to the own vehicle, and (3) incorporates the result into the external environment model 244. In addition, the external environment estimator 243 (4) estimates the position of the own vehicle on the integrated map based on a combination of highly accurate map information ("External Input 104" in FIG. 2) taken from the inside or outside of the vehicle, the position, vehicle speed, and the six degrees of freedom (6DoF) information obtained by a global positioning system (GPS) 103, for example, and (5) calculates the costs for the route described above, and (6) incorporates the result into the external environment model 244 together with the motion information on the own vehicle obtained by the various sensors. Through the processing, the external environment estimator 243 frequently updates the external environment model 244 and uses the updated model for the route generation by the route generator 247.

FIG. 4 shows an example segmentation image D2 obtained through recognition processing by the external environment estimator 243. In the segmentation image D2, each objects is classified as any of a roadway 50, a center line 51, a vehicle 61, a sign 62, a roadside tree 63, a sidewalk 71, an empty lot 72, and a building 80 by a pixel unit. In the segmentation image D2, information on the shapes of the objects 60 is recognized. The segmentation image D2 is an example of the "recognition processing data".

The signals of the positioning system such as the GPS 103, for example, and the data, for example, for car navigation transmitted from a network outside the vehicle are transmitted to the route searcher 246. The route searcher 246 searches for a wide-area route of the vehicle using the signals of the positioning system such as the GPS or the data, for example, for the navigation transmitted from the network outside the vehicle.

The route generator 247 generates the cruise route of the vehicle based on the external environment model 244 described above and the output from the route searcher 246. The cruise route is generated as follows. For example, the safety, the fuel efficiency, and other factors are scored and at least one cruise route with the lowest scores is generated. The route generator 247 may generate a cruise route based on a plurality of viewpoints, such as the cruise route adjusted in accordance with the cruise route described above and the amount of operation by the driver. The information on the cruise route generated by the route generator 247 is included in the external environment data.

As shown in FIG. 2, the recognition processing IC unit 20 includes a first vehicle model 248 and a second vehicle model 249.

The first vehicle model 248 is a 6DoF model of the vehicle indicating the behavior of the vehicle. The 6DoF model of the vehicle is obtained by modeling acceleration along three axes, namely, in the "forward/backward (surge)", "left/right (sway)", and "up/down (heave)" directions of the traveling vehicle, and the angular velocity along the three axes, namely, "pitch", "roll", and "yaw". That is, the 6DoF model of the vehicle is a numerical model grasping the vehicle motion on the plane (the forward/backward and left/right directions (i.e., the movement along the X-Y plane) and the yawing (along the Z-axis)) according to the classical vehicle motion engineering but reproducing the behavior of the vehicle using six axes in total. The six axes further include the pitching (along the Y-axis), rolling (along the X-axis) and the movement along the Z-axis (i.e., the up/down motion) of the vehicle body mounted on the four wheels with the suspension interposed therebetween. The first vehicle model 248 is used when a target motion determiner 343, which will be described later, calculates the amount of the target motion of the vehicle.

The second vehicle model 249 indicates the energy consumption of the vehicle. Specifically, the model indicates the fuel efficiencies and electric efficiencies for the operations of the actuators AC of the vehicle. Specifically, the second vehicle model 249 is obtained by modeling the opening/closing timing of intake/exhaust valves (not shown), the timing of injectors (not shown) injecting the fuel, and the opening/closing timing of the valves for the exhaust gas recirculation system, for example, at the most improved fuel efficiency in outputting a predetermined amount of the engine torque. The second vehicle model 249 is used when the energy management 345, which will be described later, calculates the control amount of the actuators of the vehicle.

<Judgment Processing IC Unit>

The judgment processing IC unit 30 functions to calculate a cruise route of the vehicle, separately from the recognition processing IC unit 20. The judgment processing IC unit 30 sets, in route generation, a safe area safely passed by the vehicle through a method typically employed by motor vehicles, for example, to set the route passing through the safe area as the cruise route to be passed by the motor vehicle. More specifically, the judgment processing IC unit 30 includes an object recognizer 251, a classifier 351, a preprocessor 352, a free space searcher 353, and a preliminary route generator 354.

Like the object recognizer 241, the object recognizer 251 receives the image processing data D1 (including the video data) output from the signal processing IC unit 10, and receives a peak list of reflected waves detected by the radars 102. The object recognizer 251 recognizes the objects outside the vehicle based on the received image processing data D1 and the received peak list. The object recognizer may employ typically known object recognition techniques based on images or radio waves.

The classifier 351 receives the results of the recognition of objects by the object recognizer 251, and classifies the recognized objects into moving and stationary objects. Specifically, the classifier 351 (1) divides the surroundings of the own vehicle into a plurality of areas (e.g., front, right, left, and rear areas), (2) integrates, for each area, the object information based on the image obtained from the cameras 101 and the object information (e.g., the sizes of the objects) recognized based on the information from the radars 102, and (3) generates, for each area, classification information on the moving and stationary objects.

The preprocessor 352 integrates the classification results for each area generated by the classifier 351. In addition, the preprocessor 352 estimates the distances, directions, and relative speeds of the moving objects with respect to the own vehicle. The results are incorporated as additional information to the moving objects. In addition, the preprocessor 352 estimates the position of the own vehicle relative to the moving and stationary objects based on a combination of highly accurate map information, the position, vehicle speed, and the 6DoF information obtained from the inside or outside of the vehicle.

As described above, the classifier 351 or the preprocessor 352 estimates the external environment based on the image processing data D1 and the information from the radars 102 without using deep learning, for example. FIG. 5 shows image processing data D3 obtained through image processing by the preprocessor 352. In this integrated data D3, the types of the objects are not recognized, and the objects around the own vehicle are uniformly recognized as the "objects 60" (to be exact, the moving and stationary objects are distinguished from each other). The detailed shapes of the objects are not recognized. As shown in FIG. 5, the rough sizes and relative positions, for example, of the objects are recognized.

The free space searcher 353 searches for a free space avoiding a collision with a moving or stationary object (hereinafter, also referred to as a "target object") whose position has been estimated by the preprocessor 352. For example, the free space searcher 353 is set based on a predetermined rule. For example, the area of several meters around the target is considered as an "unavoidable range." If the target object is a moving object, the free space searcher 353 sets the free space, taking the moving speed into consideration. The free space is, for example, an area without any dynamic obstacle, such as another vehicle or a pedestrian, or any static obstacle, such as a median strip or a center pole on a road. The free space may include a space on a road shoulder allowing emergency parking.

The preliminary route generator 354 calculates a route passing through the free space searched by the free space searcher 353. How the preliminary route generator 354 calculates a route is not particularly limited. However, for example, a plurality of routes passing through the free space are generated, and the one requiring the lowest costs is selected from the plurality of routes. The route calculated by the preliminary route generator 354 is output to the target motion determiner 343, which will be described later.

In addition, the judgment processing IC unit 30 determines the cruise route to be traveled by the vehicle and calculates the target motion of the vehicle to follow the cruise route. Specifically, the judgment processing IC unit 30 includes a critical status determiner 341, a route determiner 342, the target motion determiner 343, a vehicle kinetic energy setter 344, and an energy management 345.

Upon determination that there is a possibility of a collision with an object or a deviation of the lane based on the external environment model 244, the critical status determiner 341 sets a cruise route (e.g., the target position and the vehicle speed) for avoiding the collision or the deviation.

The route determiner 342 determines the cruise route set by the route generator 247 of the recognition processing IC unit 20, the cruise route set by the preliminary route generator 354 of the judgment processing IC unit 30, and the amount of the operation by the driver. How to determine the cruise route is not particularly limited. For example, the cruise route set by the route generator 247 may have the top priority in normal driving. If the cruise route set by the route generator 247 does not pass through the free space searched by the free space searcher 353, the cruise route set by the preliminary route generator 354 may be selected. The selected cruise route may be adjusted in accordance with the amount or direction of the operation by the driver, or the operation by the driver may have the priority.

The target motion determiner 343 determines, for example, the 6DoF target motion (e.g., the acceleration or the angular velocity) of the cruise route determined by the route determiner 342. The target motion determiner 343 may use a predetermined first vehicle model 248 in the determination on the 6DoF. The first vehicle model 248 is obtained by modeling the 6DoF motion status (e.g., the acceleration or the angular velocity) set for each vehicle, for example. The first vehicle model 248 is generated based on, for example, the basic motor functions of the vehicle set in advance or the environment information on the inside and outside of the vehicle, and is updated as appropriate.

The vehicle kinetic energy setter 344 calculates the torques required for the drive system, the steering system, and the braking system with respect to the 6DoF motion target motion determined by the target motion determiner 343. The drive system includes an engine system, a motor, and a transmission, for example. The steering system includes a steering wheel, for example. The braking system includes a brake, for example.

The energy management 345 calculates the amount of control of the actuators AC at the highest energy efficiency to achieve the target motion determined by the target motion determiner 343. Specifically, the energy management 345 calculates the opening/closing timing of intake/exhaust valves (not shown) and the timing of injectors (not shown) injecting the fuel at the most improved fuel efficiency to achieve the engine torque determined by the target motion determiner 343. The actuators AC include the engine system, the brake, the steering, and the transmission, for example. The energy management 345 may use the predetermined second vehicle model 249 to manage the energy. The second vehicle model 249 is obtained by modeling the plant conditions (e.g., the torque, the power, or the heat amount) at present or at a predetermined specified time, for example. The second vehicle model 249 is generated during the travel of the vehicle, for example, and is updated as appropriate.

The judgment processing IC unit 30 includes a vehicle condition detector 346 for generating the motion information on the own vehicle to be provided to the recognition processing IC unit 20. The vehicle condition detector 346 detects the current motion conditions of the own vehicle based on the information input from various mechanical sensors 105. The mechanical sensors 105 include a vehicle speed sensor and a yaw sensor, for example.

The judgment processing IC unit 30 includes a driver operation recognizer 347 that recognizes, as information for determining the cruise route, the amount and direction of the operation by the driver. The driver operation recognizer 347 obtains sensor information reflecting the operation by the driver, and inputs the information on the amount and direction of the operation by the driver to the route determiner 342. The sensors, which reflect the operation of the driver, detect the operation by the driver on various targets to be operated, such as an accelerator pedal, a brake pedal, a steering wheel, and various switches, for example.

The judgment processing IC unit 30 includes a failure determiner 356 that determines the presence or absence of a failure in the recognition processing IC unit 20, in particular, an abnormality in the recognition processing function of the recognition processing IC unit 20. Upon determination that there is an abnormality in the recognition processing function of the recognition processing IC unit 20, the failure determiner 356 transmits the information to the second power management unit 42. The second power management unit 42, which has received the information, turns off the recognition processing IC unit 20 regardless of the vehicle conditions. The failure determiner 356 determines that there is an abnormality in the recognition processing function of the recognition processing IC unit 20 in the following cases, for example. On a map created by the map generator 242, an oncoming vehicle is largely displaced. The cruise route generated by the route generator 247 fails to pass through the free space searched by the free space searcher 353 at a predetermined number of times or more.

The judgment processing IC unit 30 includes a scene recognizer 357 that recognizes the scene of the vehicle based on the external environment. The scene recognizer 357 recognizes the scene of the vehicle based on the information from the external environment estimator 243 or the preprocessor 352. The scene of the vehicle recognized here includes, for example, the location in which the vehicle travels, the driving state (e.g., moving forward or backing up for parking) and an amount of the objects around the own vehicle, for example.

<On/Off Control of Recognition Processing IC Unit>

Here, the recognition processing IC unit 20 of the cruise control device 1 processes a huge amount of image data and the information obtained from the radars 102 to recognize the external environment, which causes a large computational load. In particular, in this embodiment, the recognition processing IC unit 20 recognizes the external environment using deep learning and performs route generation based on the external environment after the recognition, which causes a significantly large computational load. Accordingly, the power consumption and the temperature of the recognition processing IC unit 20 tend to increase. The constant operation of the recognition processing IC unit 20 may cause heat generation and excessive power consumption of the cruise control device 1.

To address the problem, in this embodiment, the second power management unit 42 performs the on/off control of the recognition function of the external environment of the vehicle by the recognition processing IC unit 20 in accordance with the vehicle conditions. The "vehicle conditions" here include not only the scene to which the vehicle belongs (e.g., traveling on a highway or backing up for parking), but also the driving situations of the vehicle according to the intension of the driver (the autonomous driving function is turned off and the manual driving is executed), and a malfunction of the recognition processing IC unit 20.

Specifically, assume that the vehicle is traveling in an urban area in a city by autonomous driving. At this time, the traffic is busy and a large number of objects are present around the vehicle, the external environment of the vehicle may be recognized using the recognition processing IC unit 20. If the vehicle is under the circumstances described above, the second power management unit 42 turns off the recognition processing IC unit 20.

On the other hand, assume that the vehicle is traveling on a highway by autonomous driving. At this time, since there is a smaller number of objects and a simple cruise route suffices, there is no need to recognize the external environment of the vehicle utilizing the recognition processing IC unit 20. At this time, the second power management unit 42 turns off the recognition processing IC unit 20.

When the recognition processing IC unit 20 is turned off and the autonomous driving continues, the cruise control device 1 needs to recognize the external environment to some extent without using the recognition processing IC unit 20. For the purpose, in this embodiment, in order to establish data communications from the signal processing IC unit 10 to the judgment processing IC unit 30, the bypass path 90 is provided as a communication line bypassing the recognition processing IC unit 20 to connect the signal processing IC unit 10 to the judgment processing IC unit 30. As the function of recognizing the external environment of the vehicle to generate the route, the judgment processing IC unit 30 includes the object recognizer 251, the classifier 351, the preprocessor 352, the free space searcher 353, and the preliminary route generator 354 as described above.

That is, when the recognition processing IC unit 20 is turned off and the autonomous driving continues, the image processing data D1, which has been subjected to the image processing by the image processor 151 of the signal processing IC unit 10, passes through the bypass path 90 and is input to the object recognizer 251 of the judgment processing IC unit 30. Based on the image processing data D1 input to the object recognizer 251, the integrated data D3 representing the external environment is then generated by the classification processing as described above. Based on the integrated data D3, the cruise route is then generated as described above. That is, even if the recognition processing IC unit 20 is turned off, simple autonomous driving can be continued.

As described above, assume that the recognition function of the recognition processing IC unit 20 is turned off as appropriate in accordance with the vehicle conditions. This configuration reduces a huge amount of arithmetic processing in the recognition processing IC unit 20 and the heat generated in the recognition processing IC unit 20. Accordingly, the power consumption of the cruise control device 1 decreases.

Out of the vehicle conditions, the scene of the vehicle based on the external environment is identified by the scene recognizer 357 of the judgment processing IC unit 30 in this embodiment. Although not shown, the second power management unit 42 stores a table defining scenes (hereinafter, referred to as "specific scenes") in which the recognition processing IC unit 20 is to be turned off. The second power management unit 42 compares the scene identified by the scene recognizer 357 with the table, and turns off the recognition processing IC unit 20. Note that the table may be stored in the judgment processing IC unit 30. In this case, the judgment processing IC unit 30 compares the scene identified by the scene recognizer 357 with the table, and outputs a control signal to the second power management unit 42 so as to turn off the recognition processing IC unit 20.

The "specific scenes" mainly include, in addition to the situations described above such as "traveling on a highway" or "backing up for parking", the situations, such as "traveling in a suburb" or "traveling at midnight", basically with less objects around the own vehicle. The "specific scenes" further include the situations not requiring the recognition processing itself, such as "parking in a parking lot in an ignition-on state".

In this embodiment, as shown in FIG. 1, the cruise control device 1 includes a switch 108 capable of selecting the on/off state of the recognition function of the recognition processing IC unit 20 in accordance with the intention of the driver. This switch 108 is, for example, for turning on/off the autonomous driving function of the vehicle. Signals from this switch 108 are input to the judgment processing IC unit 30 and the second power management unit 42. Upon receipt of a signal for turning off the autonomous driving function from the switch 108, the judgment processing IC unit 30 stops the processing by the object recognizer 251 or other elements. The second power management unit 42 turns off the recognition processing IC unit 20. This allows turning off of the recognition function of the recognition processing IC unit 20.

Now, the processing operation for the on/off control of the recognition processing IC unit 20 by the second power management unit 42 will be described with reference to FIG. 6.

First, in step S1, the second power management unit 42 obtains various information. This various information includes signals from the switch 108 or information on the scene of the vehicle from the scene recognizer 357.

Next, in step S2, the second power management unit 42 determines whether the switch 108 for the autonomous driving is on. If the answer is YES, that is, if the switch 108 is on and the autonomous driving function is being executed, the process proceeds to step S3. On the other hand, if the answer is No, that is, if the switch 108 is off and the autonomous driving function is not being executed, the process proceeds to step S5.

Next, in step S3, the second power management unit 42 determines whether the vehicle conditions correspond to the "specific scenes". If the answer is NO, that is, if the vehicle conditions do not correspond to the "specific scenes", the process proceeds to step S3. On the other hand, if the answer is YES, that is, if the vehicle conditions correspond to the "specific scenes", the process proceeds to step S5.

In step S4 described above, the second power management unit 42 maintains the on-state of the recognition processing IC unit 20. After step S4, the process returns.

On the other hand, in step S5, the second power management unit 42 turns off the recognition processing IC unit 20. After step S5, the process returns.

The device according to this embodiment includes: the signal processing IC unit 10 mounted in the vehicle, and for performing the image processing on the outputs from the cameras 101 for capturing the external environment of the vehicle to output the image processing data D1 obtained through the image processing; the recognition processing IC unit 20 different from the signal processing IC unit 10, and for performing the recognition processing of the external environment of the vehicle based on the image processing data D1 to output the external environment data obtained through the recognition processing; the judgment processing IC unit 30 different from the signal and recognition processing IC units 10 and 20, and for performing the judgment processing for the cruise control of the vehicle based on the image processing data D1 or the external environment data; the second power management unit 42 capable of controlling the on or off state of the recognition function of the external environment of the vehicle in the recognition processing IC unit 20 according to the conditions of the vehicle; and the bypass path 90 for enabling the data communications from the signal processing IC unit 10 to the judgment processing IC unit 30 without performing the recognition processing of the external environment of the vehicle by the recognition processing IC unit 20. With the configuration described above, the judgment processing IC unit 30 obtains the image processing data D1 from the signal processing IC unit 10 through the bypass path 90, and calculates the parameters related to the vehicle cruise based on the image processing data D1. The recognition function of the recognition processing IC unit 20 is turned off as appropriate in accordance with the vehicle conditions to reduce a huge amount of the arithmetic processing by the recognition processing IC unit 20, which reduces the power consumption of the cruise control device 1. This configuration also reduces the heat generated in the recognition processing IC unit 20 and an increase in the power consumption.

The judgment processing IC unit 30 calculates the parameters related to the vehicle cruise based on the image processing data D1. Accordingly, the judgment processing IC unit 30 executes proper cruise control using the image processing data D1 obtained via the bypass path 90, even if there is a wrong recognition function the external environment due to a failure of the recognition processing IC unit 20 or any other factor.

In particular, in this embodiment, the recognition processing IC unit 20 is configured to perform the recognition processing of the external environment using deep learning techniques based on the image processing data D1. Since the recognition processing IC unit 20 uses the deep learning techniques, the recognition processing of the external environment by the recognition processing IC unit 20 requires a large computational load. Accordingly, the recognition function of the external environment of the recognition processing IC unit 20 is turned off as appropriate to reduce the power consumption more effectively.

In this embodiment, the vehicle control device may further include the switch 108 capable of selecting the on/off state of the recognition function of the recognition processing IC unit 20 according to an intention of the driver of the vehicle. If the switch 108 selects turning off the recognition function of the recognition processing IC unit 20, the second power management unit 42 turns off the recognition function of the recognition processing IC unit 20. This configuration allows turning off of the recognition function of the recognition processing IC unit 20 in accordance with the intention of the driver of the vehicle. For example, even when the vehicle is traveling in a city, the recognition function of the recognition processing IC unit 20 can be turned off as appropriate. As a result, the power consumption decreases more effectively.

In this embodiment, the vehicle control unit further includes the failure determiner 356 for determining the presence or absence of an abnormality in the recognition processing IC unit 20. If the failure determiner 356 determines that there is an abnormality in the recognition processing IC unit 20, the second power management unit 42 turns off the recognition function of the recognition processing IC unit 20 regardless of the conditions of the vehicle. That is, if there is an abnormality in the recognition processing IC unit 20, the external environment data output from the recognition processing IC unit 20 is highly likely to include an error. For this reason, if the parameters related to the vehicle cruise are calculated based on the external environment data output from the recognition processing IC unit 20 which has an abnormality, the vehicle cruise control cannot be performed properly. To address the problem, upon determination that there is an abnormality in the recognition processing IC unit 20, the recognition function of the recognition processing IC unit 20 is turned off regardless of the conditions of the vehicle. Accordingly, the judgment processing IC unit 30 calculates less or no parameters related to the vehicle cruise based on the erroneous external environment data. As a result, even if there is a wrong recognition function of the external environment, proper cruise control can be executed more effectively.

FIG. 7 shows a vehicle cruise control device 1 according to a variation of this embodiment. In this variation, a bypass path 290 is included in the recognition processing IC unit 20 instead of bypassing the recognition processing IC unit 20. Specifically, the recognition processing IC unit 20 includes inside, a communication path for the recognition processing and the bypass path 290 that is a communication path not for the recognition processing. Upon execution of the arithmetic processing by the processors 241 to 247 including the object recognizer 241, the communication path for the recognition processing allows the transmission of the recognition processing data (e.g., the data on the cruise route) after the arithmetic processing to the judgment processing IC unit 30. On the other hand, the bypass path 290 allows direct transmission of the image processing data D1 to the judgment processing IC unit 30 without executing the recognition processing.

In this variation, the recognition processing IC unit 20 itself is not turned off even in any of the specific scenes. Instead, the operations of the processors 241 to 247 for the recognition processing in the recognition processing IC unit 20 are turned off. When the autonomous driving function is turned off by the operation of the switch 108 as well, the recognition processing IC unit 20 itself is not turned off, and the operations of the processors 241 to 247 for the recognition processing in the recognition processing IC unit 20 are turned off. At this time, as shown in FIG. 7, the power management unit capable of controlling the on/off of the recognition function of the external environment of the vehicle in the recognition processing IC unit 20 is included in the recognition processing IC unit 20.

Even in this configuration, the recognition function of the recognition processing IC unit 20 can be properly turned off, and a huge amount of the arithmetic processing is reduced in the recognition processing IC unit 20. This reduces the power consumption of the cruise control device 1.

The present disclosure is not limited to the embodiment described above, and may be modified within the scope of the claims.

For example, an example has been described above in the embodiment where the cruise route is generated simultaneously by both the recognition processing IC unit 20 and the judgment processing IC unit 30. The present disclosure is not limited thereto. Basically, only the recognition processing IC unit 20 may generate the cruise route. Only when the recognition function of the recognition processing IC unit 20 is turned off, the judgment processing IC unit 30 may generate the cruise route.

An example has been described above in the embodiment where the image processing data D1 is transmitted from the signal processing IC unit 10 through the bypass path 90 or 290 to the judgment processing IC unit 30 regardless of the on/off state of the recognition function of the recognition processing IC unit 20. The present disclosure is not limited thereto. Only when the recognition function of the recognition processing IC unit 20 is turned off, the image processing data D1 may be transmitted from the signal processing IC unit 10 through the bypass path 90 or 290 to the judgment processing IC unit 30.

In the embodiment described above, the scene recognizer 357 is located in the judgment processing IC unit 30. The present invention is not limited thereto. The scene recognizer 357 may be located in the recognition processing IC unit 20.

In the embodiment described above, the respective power management units are provided for the IC units 10, 20, and 30. The present invention is not limited thereto. The on/off control of the IC units 10, 20, and 30 may be executed by a single power management unit.

The embodiment described above is merely an example in nature, and the scope of the present disclosure should not be interpreted in a limited manner. The scope of the present disclosure is defined by the appended claims, and all variations and modifications belonging to a range equivalent to the range of the claims are within the scope of the present disclosure.

What is claimed is:

1. A vehicle control device mounted in a vehicle and capable of performing cruise control of the vehicle according to an external environment of the vehicle, the device comprising:
   a first integrated circuit (IC) unit mounted in the vehicle, and for performing image processing on an output from a camera for capturing the external environment of the vehicle to output image processing data obtained through the image processing;
   a second IC unit different from the first IC unit, and for performing recognition processing of the external environment of the vehicle based on the image processing data to output external environment data obtained through the recognition processing;
   a third IC unit different from the first and second IC units, and for performing judgment processing for the cruise control of the vehicle based on the image processing data or the external environment data;
   a power management unit capable of controlling an on or off state of a recognition function of the external environment of the vehicle in the second IC unit according to a condition of the vehicle; and
   a bypass path for enabling data communication of the image processing data from the first IC unit to the third IC unit without performing the recognition processing of the external environment of the vehicle by the second IC unit, wherein
      the second IC unit generates information about a first traveling route of the vehicle based on the external environment of the vehicle and outputs the information about the first traveling route as the external environment data to the third IC unit,
      the third unit generates information about a second traveling route of the vehicle by a method different from that of the second IC unit based on the image processing data obtained through the bypass path, and
      the third IC unit determines which of the first traveling route and the second traveling route that the vehicle travels on based on the information about the first traveling route generated by the second IC unit or the information about the second traveling route generated by the third IC unit.

2. The vehicle control device of claim 1, wherein
   the second IC unit is configured to perform the recognition processing of the external environment using deep learning techniques based on the image processing data.

3. The vehicle control device of claim 2, wherein
   the bypass path is configured as a communication line bypassing the second IC unit to connect the first IC unit to the third IC unit.

4. The vehicular control device of claim 3, further comprising
   a switch capable of selecting an on or off state of the recognition function of the second IC unit according to an intention of an occupant of the vehicle, wherein
   if the switch selects turning off the recognition function of the second IC unit, the power management unit turns off the recognition function of the second IC unit.

5. The vehicular control device of claim 4, further comprising:
   an abnormality determiner for determining presence or absence of an abnormality in the second IC unit, wherein
   if the abnormality determiner determines that there is an abnormality in the second IC unit, the power management unit turns off the recognition function of the second IC unit regardless of a condition of the vehicle.

6. The vehicle control device according to claim 1, wherein
   the bypass path is configured as a communication line bypassing the second IC unit to connect the first IC unit to the third IC unit.

7. The vehicle control device according to claim 1, further comprising:
   a switch capable of selecting an on or off state of the recognition function of the second IC unit according to an intention of an occupant of the vehicle, wherein
   if the switch selects turning off the recognition function of the second IC unit, the power management unit turns off the recognition function of the second IC unit.

8. The vehicle control device according to claim 1, further comprising:
   an abnormality determiner for determining presence or absence of an abnormality in the second IC unit, wherein
   if the abnormality determiner determines that the abnormality is detected in the second IC unit, the power management unit turns off the recognition function of the second IC unit regardless of a condition of the vehicle.

9. The vehicle control device according to claim 2, further comprising:
   a switch capable of selecting an on or off state of the recognition function of the second IC unit according to an intention of an occupant of the vehicle, wherein if the switch selects turning off the recognition function of the second IC unit, the power management unit turns off the recognition function of the second IC unit.

10. The vehicle control device according to claim 2, further comprising:
an abnormality determiner for determining presence or absence of an abnormality in the second IC unit, wherein
if the abnormality determiner determines that the abnormality is detected in the second IC unit, the power management unit turns off the recognition function of the second IC unit regardless of a condition of the vehicle.

11. The vehicle control device according to claim 3, further comprising:
an abnormality determiner for determining presence or absence of an abnormality in the second IC unit, wherein
if the abnormality determiner determines that the abnormality is detected in the second IC unit, the power management unit turns off the recognition function of the second IC unit regardless of a condition of the vehicle.

12. The vehicle control device according to claim 6, further comprising:
a switch capable of selecting an on or off state of the recognition function of the second IC unit according to an intention of an occupant of the vehicle, wherein
if the switch selects turning off the recognition function of the second IC unit, the power management unit turns off the recognition function of the second IC unit.

13. The vehicle control device according to claim 6, further comprising:
an abnormality determiner for determining presence or absence of an abnormality in the second IC unit, wherein
if the abnormality determiner determines that the abnormality is detected in the second IC unit, the power management unit turns off the recognition function of the second IC unit regardless of a condition of the vehicle.

14. The vehicle control device according to claim 7, further comprising:
an abnormality determiner for determining presence or absence of an abnormality in the second IC unit, wherein
if the abnormality determiner determines that the abnormality is detected in the second IC unit, the power management unit turns off the recognition function of the second IC unit regardless of a condition of the vehicle.

15. The vehicle control device according to claim 9, further comprising:
an abnormality determiner for determining presence or absence of an abnormality in the second IC unit, wherein
if the abnormality determiner determines that the abnormality is detected in the second IC unit, the power management unit turns off the recognition function of the second IC unit regardless of a condition of the vehicle.

16. The vehicle control device according to claim 12, further comprising:
an abnormality determiner for determining presence or absence of an abnormality in the second IC unit, wherein
if the abnormality determiner determines that the abnormality is detected in the second IC unit, the power management unit turns off the recognition function of the second IC unit regardless of a condition of the vehicle.

17. The vehicle control device according to claim 1, wherein
the second IC unit includes
a first object recognizer recognizing an object outside the vehicle from the image processing data and a peak data of a radar mounted in the vehicle,
a map generator integrating object information recognized from the image processing data and object information recognized from the peak data of the radar, and reflecting the integrated information to map data indicating the external environment, of the vehicle,
an external environment estimator obtaining an external environment model by generating a 3D map of the external environment of the vehicle from the map data generated by the map generator,
a route searcher searching for a route of the vehicle, and
a route generator generating the first traveling route of the vehicle by using the external environment model and an output of the route searcher, and
the third IC unit includes
a second object recognizer recognizing an object outside the vehicle from the image processing data and peak data of the radar,
a classifier classifying the object recognized by the second object recognizer into a moving object and a stationary object,
a preprocessor estimating a position of the vehicle relative to the moving object and the stationary object classified by the classifier,
a free space searcher searching for a free space avoiding a collision with the moving object and the stationary object of which positions are estimated by the preprocessor, and
a preliminary route generator calculating a route passing through the free space searched by the free space searcher.

* * * * *